(12) United States Patent
Nielson (10) Patent No.: US 11,249,234 B2
(45) Date of Patent: Feb. 15, 2022

(54) POLARIZER WITH COMPOSITE MATERIALS

(71) Applicant: Moxtek, Inc., Orem, UT (US)

(72) Inventor: R. Stewart Nielson, Pleasant Grove, UT (US)

(73) Assignee: Moxtek, Inc., Orem, UT (US)

( * ) Notice: Subject to any disclaimer, the term of this patent is extended or adjusted under 35 U.S.C. 154(b) by 19 days.

(21) Appl. No.: 16/929,457

(22) Filed: Jul. 15, 2020

(65) Prior Publication Data

US 2021/0033767 A1 Feb. 4, 2021

Related U.S. Application Data

(60) Provisional application No. 62/879,947, filed on Jul. 29, 2019.

(51) Int. Cl.
*G02B 5/30* (2006.01)

(52) U.S. Cl.
CPC .................. *G02B 5/3075* (2013.01)

(58) Field of Classification Search
CPC ....... G02B 5/3075; G02B 1/14; G02B 5/3058
See application file for complete search history.

(56) References Cited

U.S. PATENT DOCUMENTS

| 9,632,224 B2 | 4/2017 | Nielson et al. | |
|---|---|---|---|
| 2013/0286358 A1* | 10/2013 | Takahashi | G02B 5/3008 353/20 |
| 2016/0062017 A1* | 3/2016 | Nielson | G02B 5/3058 353/31 |

OTHER PUBLICATIONS

Woltgens et.al. ("optical, electrical and structural properties of Al—Ti and Al—Cr thin films", Thin Solid Films, 3888, p. 237-244, 2001) (Year: 2001).*

* cited by examiner

*Primary Examiner* — Robert E. Tallman
(74) *Attorney, Agent, or Firm* — Thorpe, North & Western, LLP (57) ABSTRACT

It would be advantageous to improve polarizer high temperature resistance, corrosion resistance, oxidation resistance, optical properties, and etchability. Composite polarizer materials can be used to achieve this. A polarizer can comprise polarization structures configured for polarization of light. The polarization structures can include a reflective rib, the reflective rib being a composite of two different elements. The polarization structures can include an absorptive rib, the absorptive rib being a composite of two different elements. The polarizer can include a transparent layer, the transparent layer being a composite of two different elements.

20 Claims, 5 Drawing Sheets

POLARIZER WITH COMPOSITE MATERIALS

CLAIM OF PRIORITY

This application claims priority to U.S. Provisional Patent Application No. 62/879,947, filed on Jul. 29, 2019, which is incorporated herein by reference.

FIELD OF THE INVENTION

The present application is related generally to polarizers.

BACKGROUND

There are many desirable characteristics of polarizer materials. These characteristics include a narrow range of optical properties, such as reflectance R, refractive index n, extinction coefficient k, and electrical resistivity. Nanometer-sized polarization structures are typically formed by etching, so etchability can be another desirable characteristic.

Polarizers are used in image projectors. Brighter and smaller projectors have resulted in increased polarizer temperature, and resulting deformation or melting of polarizer components. Consequently, it would also be useful for polarizers to be able to withstand higher temperatures.

Polarization structures can be small and delicate with nanometer-sized pitch, wire-width, and wire-height. Polarizers are used in systems (e.g. image projectors, semiconductor inspection tools, etc.) that require high performance. Small defects in the polarizer, such as corroded ribs or collapsed ribs can significantly degrade system performance (e.g. distorted image from a computer projector). Oxidation of the ribs can degrade system performance by adversely affecting contrast. Therefore, it can be useful to protect the ribs or other polarization structures from corrosion and oxidation.

SUMMARY

It has been recognized that it would be advantageous to improve polarizer optical properties, etchability, high temperature resistance, corrosion resistance, and oxidation resistance. The present invention is directed to various embodiments of polarizers that satisfy these needs. Each embodiment may satisfy one, some, or all of these needs. The polarizer can include a reflective rib, an absorptive rib, a transparent layer, or combinations thereof, each being a composite of two different elements.

BRIEF DESCRIPTION OF THE DRAWINGS (DRAWINGS MIGHT NOT BE DRAWN TO SCALE)

FIG. 7c1 is a schematic, cross-sectional side-view of a polarizer 70d, including polarization structures 12 configured for polarization of light, and a thin film 75 as a conformal coating along sides $12_s$ of and at the distal end $12_d$ of the polarization structures 12, and also along exposed parts of the substrate 11, in accordance with an embodiment of the present invention.

DEFINITIONS

As used herein, "Al" means aluminum, "Ag" means silver, "Au" means gold, "B" means boron, "C" means carbon, "Ce" means cerium, "Cr" means chromium, "Ge" means germanium, "Hf" means hafnium, "Mg" means magnesium, "Mo" means molybdenum, "Nb" means niobium, "Nd" means neodymium, "Ni" means nickel, "Pt" means platinum, "Sc" means scandium, "Si" means silicon, "Ta" means tantalum, "Th" means thorium, "Ti" means titanium, and "W" means tungsten.

Metal and metalloid oxides, nitrides, and fluorides listed herein, include the common stoichiometric combination, plus other combinations, including nonstoichiometric combinations.

As used herein, the term "composite" means a mixture, alloy, or compound of multiple elements or materials.

As used herein, the term "continuous", as in "continuous thin film", means that the thin film is not divided into separate grid or wires.

As used herein, the term "elongated" means that a length $L_{12}$ of the polarization structures 12 is substantially larger than polarization structure 12 width $W_{12}$, thickness $Th_{12}$, or pitch P. For example, the length $L_{12}$ can be ≥10 times, ≥100 times, ≥1000 times, or ≥10,000 times larger than the $W_{12}$, the thickness $Th_{12}$, the pitch P, or combinations thereof. Polarization structure $W_{12}$, thickness $Th_{12}$, and pitch P can have nanometer dimensions (i.e. all <1 micrometer), but length $L_{12}$ can have millimeter dimensions (i.e. >1 mm).

As used herein, the term "evenly", with regard to a mixture of materials, means exactly even, even within normal manufacturing tolerances, or nearly even, such that any deviation from exactly even would have negligible effect for ordinary use of the device.

As used herein, the term "fill the channels" means completely filled, filled within normal manufacturing tolerances, or almost completely filled, such that any deviation from completely filled would have negligible effect for ordinary use of the device.

As used herein, the terms "metal" and "metals" do not include metalloid(s).

As used herein, the terms "on" and "located on" mean located directly on or located above with some other solid material between.

As used herein, the term "mm" means millimeter(s) and the term "nm" means nanometer(s).

As used herein, the term "ohm*m" means ohms times meters, units for electrical resistivity.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum (≥10 nm & <400 nm), across the visible spectrum (≥400 nm & <700 nm), across the infrared spectrum (≥700 nm & ≤1 mm), or combinations thereof, and can have a different property in a different wavelength range. Thus, whether a material is absorptive, reflective, or transparent is dependent on the intended wavelength range of use. Materials are divided into absorptive, reflective, and transparent based on reflectance R, the real part of the refractive index n, and the imaginary part of the refractive index/ extinction coefficient k. Equation 1 is used to determine the reflectance R of the interface between air and a uniform slab of the material at normal incidence:

$$R = \frac{(n-1)^2 + k^2}{(n+1)^2 + k^2} \qquad \text{Equation 1}$$

Unless explicitly specified otherwise herein, materials with k≤0.1 in the wavelength range are "transparent" materials, materials with k>0.1 and R≤0.6 in the specified wavelength range are "absorptive" materials, and materials with k>0.1 and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

Unless explicitly noted otherwise herein, all temperature-dependent values are such values at 25° C.

DETAILED DESCRIPTION

Polarization Structures 12

As illustrated in FIGS. 1-6, polarizers 10, 30, 40, and 60 are shown comprising polarization structures 12. The polarization structures 12 can be located on a substrate 11. The polarization structures 12 can be configured for polarization of light.

Figure 1:
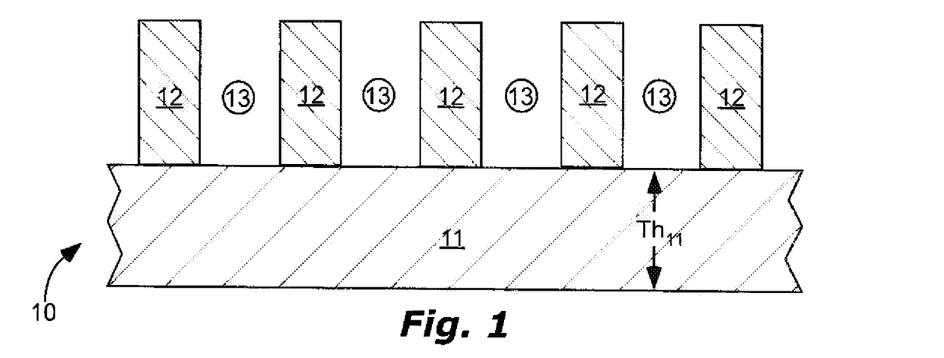
FIG. 1 is a schematic, cross-sectional side-view of a polarizer 10, including polarization structures 12 configured for polarization of light, in accordance with an embodiment of the present invention.
Figure 2:
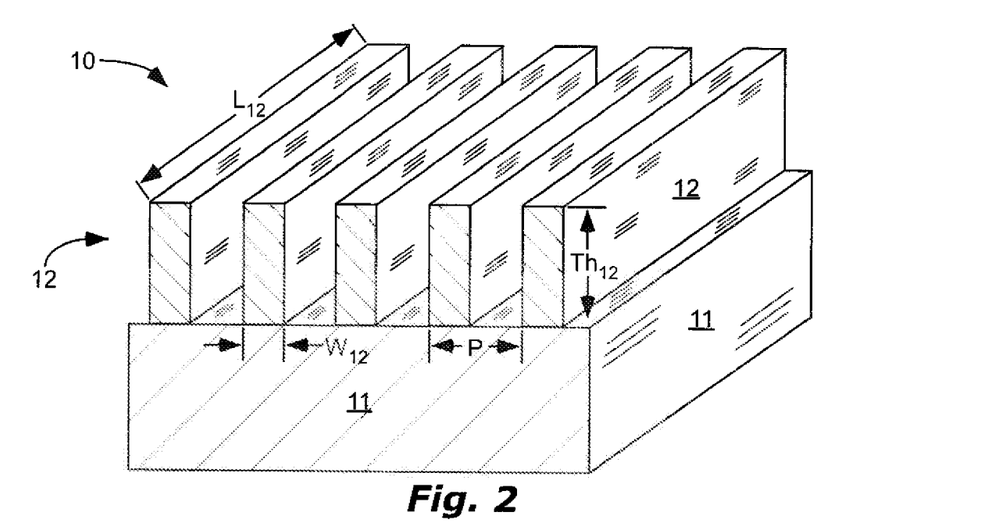
FIG. 2 is a schematic perspective-view of polarizer 10, in accordance with an embodiment of the present invention.
Figure 3:
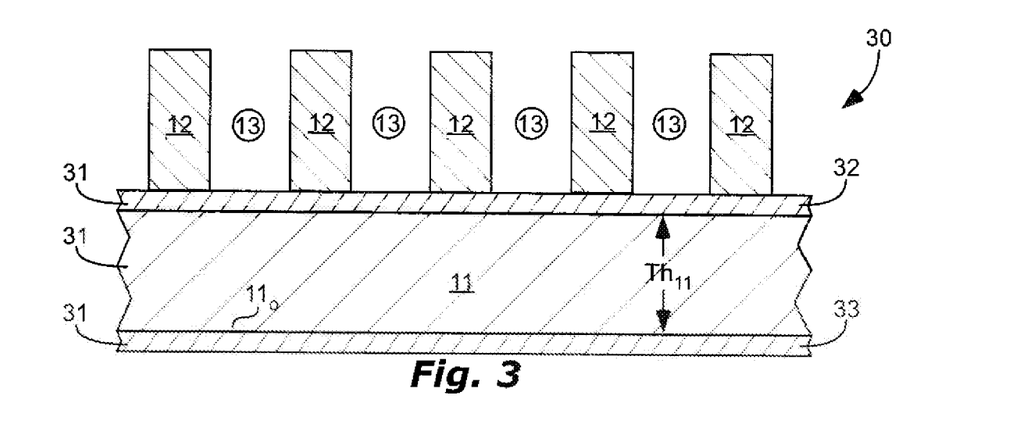
FIG. 3 is a schematic, cross-sectional side-view of a polarizer 30, including polarization structures 12 configured for polarization of light, a thin film 32 between the polarization structures 12 and the substrate 11, and a thin film 33 on an opposite side 11o of the substrate 11 from the polarization structures 12, in accordance with an embodiment of the present invention.

As illustrated in FIGS. 1-3, the polarization structures 12 can be an array of wires with a channel 13 between adjacent wires. The array of wires can be parallel and elongated.

Figure 4:
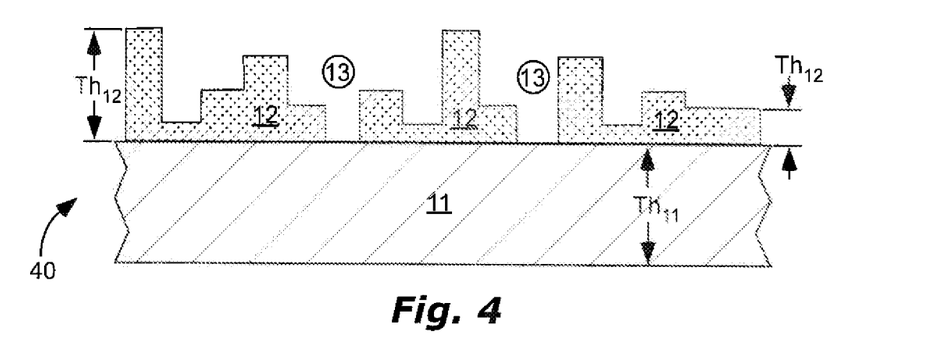
FIG. 4 is a schematic, cross-sectional side-view of a polarizer 40, including polarization structures 12 configured for polarization of light, in accordance with an embodiment of the present invention.
Figure 5:
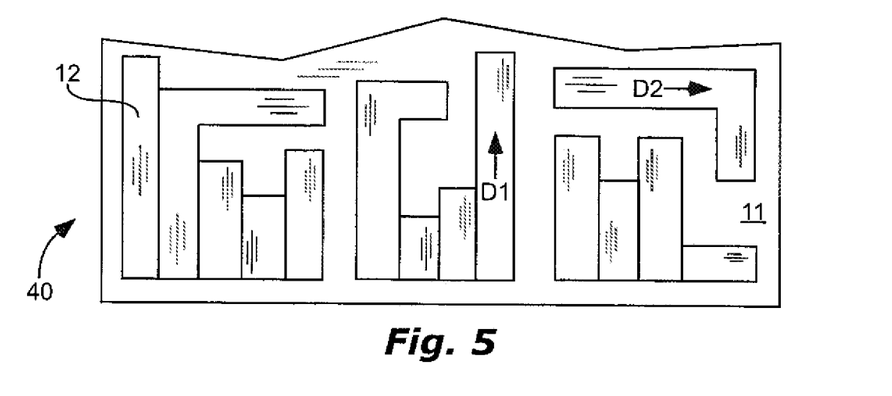
FIG. 5 is a schematic, top-view of polarizer 40, in accordance with an embodiment of the present invention.
Figure 6:
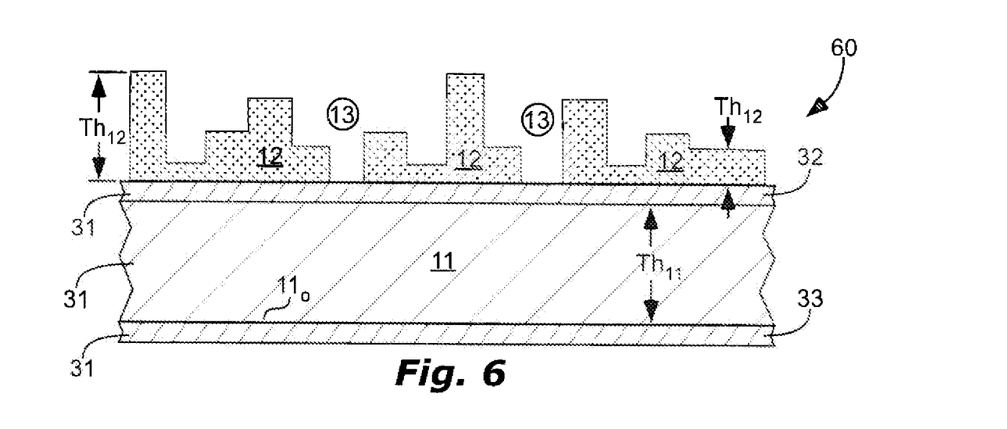
FIG. 6 is a schematic, cross-sectional side-view of a polarizer 60, including polarization structures 12 configured for polarization of light, a thin film 32 between the polarization structures 12 and the substrate 11, and a thin film 33 on an opposite side 11o of the substrate 11 from the polarization structures 12, in accordance with an embodiment of the present invention.

As illustrated in FIGS. 4-6, the polarization structures 12 can be a metamaterial polarizer. For polarizers 40 and 60, a longitudinal dimension of some of the polarization structures 12 can extend in a first direction D1, a longitudinal dimension of other of the polarization structures 12 can extend in a second direction D2, and the first direction D1 can be a different direction from the second direction D2. The first direction D1 can be perpendicular to the second direction D2. The polarization structures 12 of polarizers 40 and 60 can have multiple thicknesses $Th_{12}$, such as for example ≥2 thicknesses $Th_{12}$, ≥3 thicknesses $Th_{12}$ ≥4 thicknesses $Th_{12}$, or ≥5 thicknesses $Th_{12}$. Each thickness difference can be at least 10% different with respect to other thicknesses $Th_{12}$.

Continuous Transparent Layers

As illustrated in FIGS. 3 and 6, the substrate 11 can be a continuous structure (not interrupted to form a grid) and can be a composite transparent layer with properties as described below. Example minimum thicknesses $Th_{11}$ of the substrate 11 include $Th_{11}$≥0.1 mm, $Th_{11}$≥0.4 mm, or $Th_{11}$≥0.6 mm.

As illustrated in FIGS. 3 and 6-8, the polarizers can have properties similar to polarizers 10 and 40 described above, but further comprising continuous thin-film(s) 31. The continuous thin-film(s) 31 can be transparent layer(s) with properties as described below. As illustrated in FIGS. 3 and 6, the continuous thin-film 31 can be a thin film 32 between the polarization structures 12 and the substrate 11, a thin film 33 on an opposite side 11$_o$ of the substrate 11 from the polarization structures 12, or both. As illustrated in FIGS. 7a-7d, the continuous thin-films 31 can be thin films 71, 72, 73, 74, and 75 at a distal end 12$_d$ of the polarization structures 12 farthest from the substrate 11. Thin-films 32, 33, or both can be combined with any of thin films 71, 72, 73, 74, and 75.

Figure 7A:
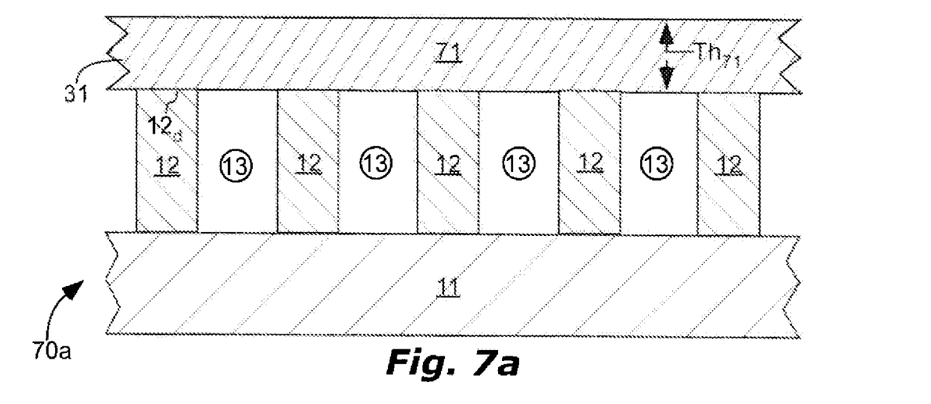
FIG. 7a is a schematic, cross-sectional side-view of a polarizer 70a, including: polarization structures 12 configured for polarization of light; a channel 13 between adjacent polarization structures 12; and a thin film 71 at a distal end $12_d$ of the polarization structures 12, spanning the channels 13 and leaving the channels air-filled; in accordance with an embodiment of the present invention.
Figure 7B:
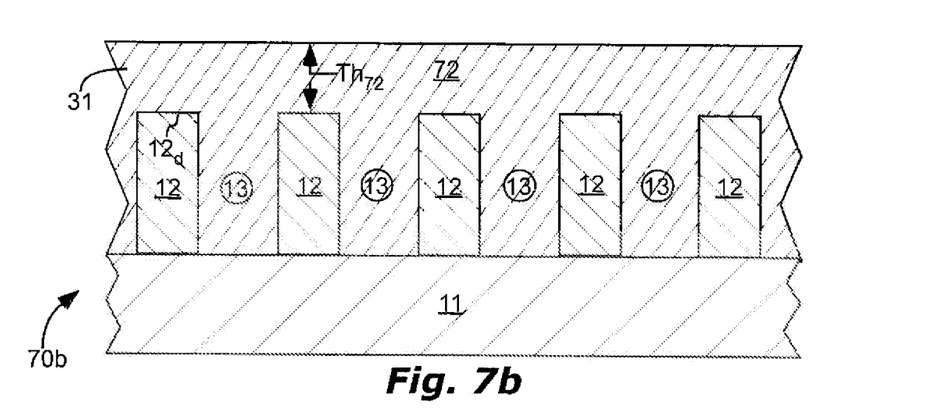
FIG. 7b is a schematic, cross-sectional side-view of a polarizer 70b, including polarization structures 12 configured for polarization of light, a channel 13 between adjacent polarization structures 12, and a thin film 72 at a distal end $12_d$ of the polarization structures 12 and filling the channels 13, in accordance with an embodiment of the present invention.
Figure 7C:
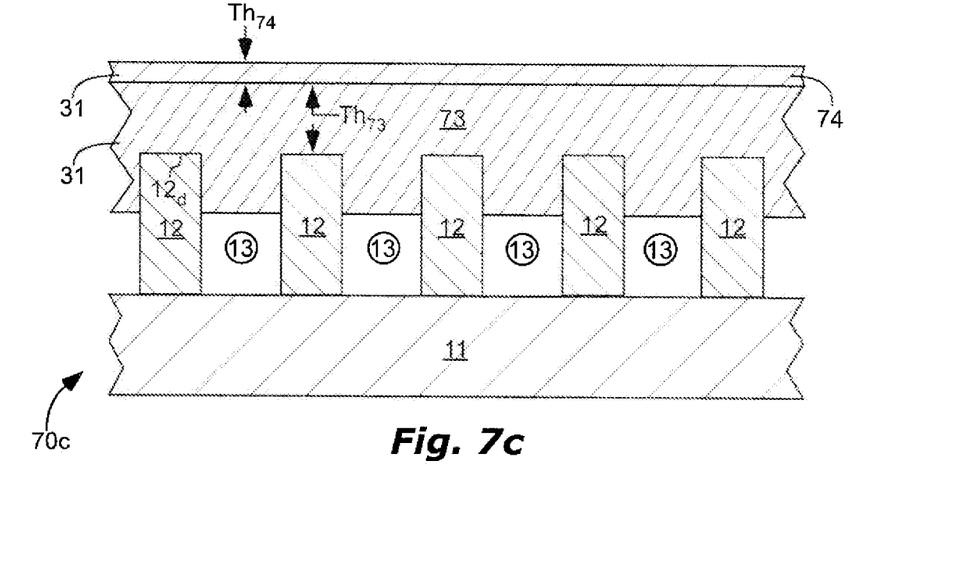
FIG. 7c is a schematic, cross-sectional side-view of a polarizer 70c, including polarization structures 12 configured for polarization of light, and multiple thin films 73 and 74 at a distal end $12_d$ of the polarization structures 12, in accordance with an embodiment of the present invention.
Figure 7D:
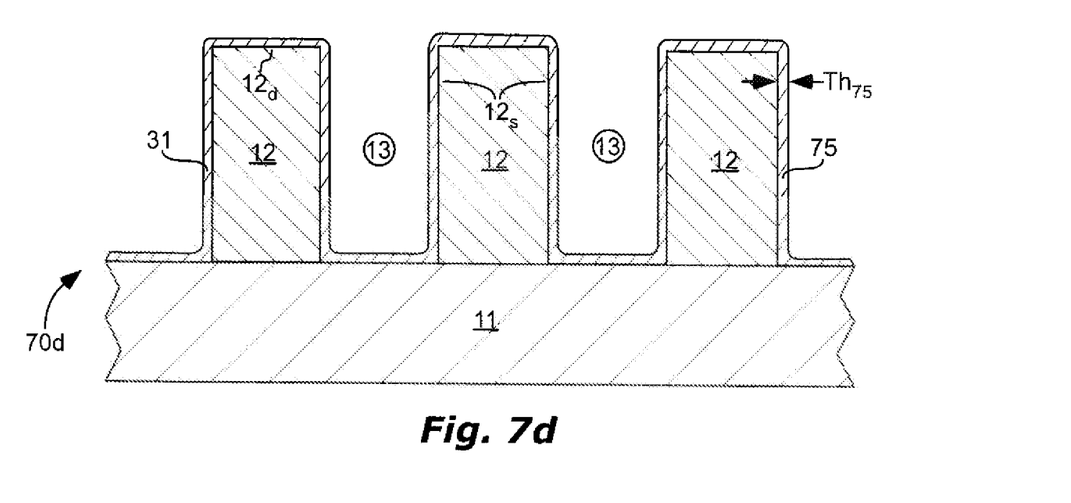

As illustrated in FIG. 7a, thin film 71 can span the channels 13 and can leave the channels air-filled. As illustrated in FIG. 7b, thin film 72 can fill the channels 13. As illustrated in FIG. 7c, thin film 73 can partially fill the channels 13, and a remainder of the channels 13 can be air filled.

Also illustrated in FIG. 7c, there can be multiple thin films 73 and 74 at the distal end $12_d$ of the polarization structures 12. Thin film 73 can be a lower continuous thin film between the substrate 11 and the upper continuous thin film, thin film 74. Thin film 74 can be applied on thin films 72 or 73. An upper continuous thin film, thin film 74, can be added above thin film 71 or thin film 72.

Thin films 71-74 can provide structural support for the polarization structures 12, can protect the polarization structures 12 from handling, dust, or corrosion, can be used as a heat sink to draw heat away from the polarization structures 12, can be used to improve polarizer performance, or combinations thereof. A choice between polarizers 70a-70c can be made based on desired index of refraction in the channels and whether protection of the polarization structures 12 in the channels 13 is needed. Example thicknesses $Th_{71}$, $Th_{72}$, $Th_{73}$, and $Th_{74}$ of thin films 71, 72, 73, and 74, respectively, include ≥10 nm, ≥50 nm, or ≥100 nm; and ≤100 nm, ≤250 nm, ≤500 nm, or ≤1000 nm.

As illustrated in FIG. 7d, thin film 75 can be a conformal coating along sides $12_s$ of and at the distal end $12_d$ of the polarization structures 12, and also along exposed parts of the substrate 11. Thin film 75 can protect the polarization structures 12 from corrosion, oxidation, or both. Example thicknesses $Th_{75}$ of thin film 75 include ≥0.5 nm, ≥1 nm, or ≥5 nm; and ≤5 nm, ≤10 nm, ≤20 nm, or ≤30 nm. Thin film 75 can be combined with thin films 32, 33, 71, 72, 73, 74, or combinations thereof.

Figure 8:
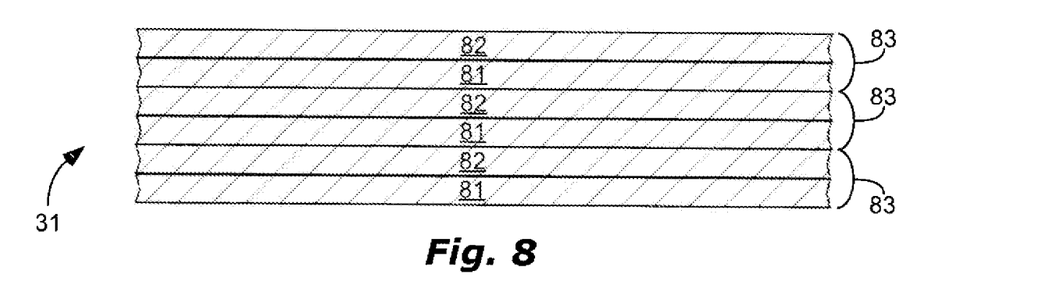
FIG. 8 is a schematic, cross-sectional side-view of continuous thin-film 31, including repeated thin film pairs 83, in accordance with an embodiment of the present invention.

As illustrated in FIG. 8, the continuous thin-film 31 can be repeated thin film pairs 83 (e.g. ≥2 pairs, ≥3 pairs, or ≥4 pairs). Each of the thin film pairs 83 can include a high index layer 81 and a low index layer 82. Either the high index layer 81 or the low index layer 82 can be closest to the substrate 11. It can be preferable, however, to have the high index layer 81 closest to the substrate 11, the low index layer 82 as an outermost layer (i.e. outermost of the high index layers 81 and the low index layers 82), or both, for protection of the high index layer 81.

The high index layer 81, the low index layer 82, or both can be composites of two different elements, as described below. The high index layer 81 can have an index of refraction n≥1.8, n≥1.9, n≥2, n≥2.2, or n≥2.4 and an extinction coefficient k≤0.1. The low index layer 82 can have index of refraction n≤1.4, n≤1.5, n≤1.6, n≤1.7, or n≤1.8 and an extinction coefficient k≤0.1. The indices of refraction and extinction coefficients of this paragraph are such values across the ultraviolet spectrum, the visible spectrum, the infrared spectrum, or combinations thereof.

Reflective Rib 91 and Dielectric Rib 92

Illustrated in FIGS. 9a-9e, and described below, are example characteristics of the polarization structures 12. These characteristics can be applied to any of the polarizer embodiments described herein. The polarization structures 12 can include reflective rib(s) 91, dielectric rib(s) 92, or combinations thereof. Each reflective rib 91 can be a composite as described below. Each dielectric rib 92 can be an absorptive rib or a transparent rib, and can be a composite as described below.

Figure 9A:
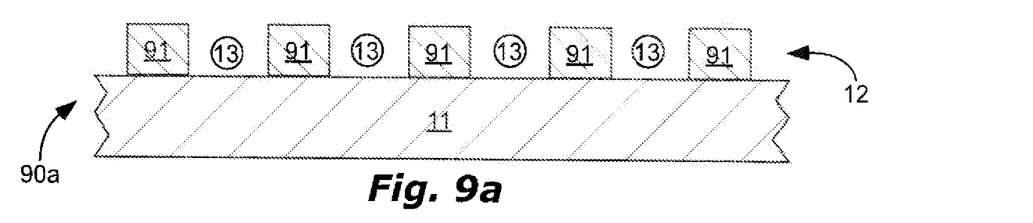
FIG. 9a is a schematic, cross-sectional side-view of a polarizer 90a, including polarization structures 12 configured for polarization of light, the polarization structures 12 including a reflective rib 91, in accordance with an embodiment of the present invention.

The polarization structures 12 of polarizer 90a in FIG. 9a comprise a reflective rib 91. Only a single reflective rib 91 is illustrated in FIG. 9a, but the polarizer 90a can include additional reflective ribs 91 in each polarization structure 12.

Figure 9B:
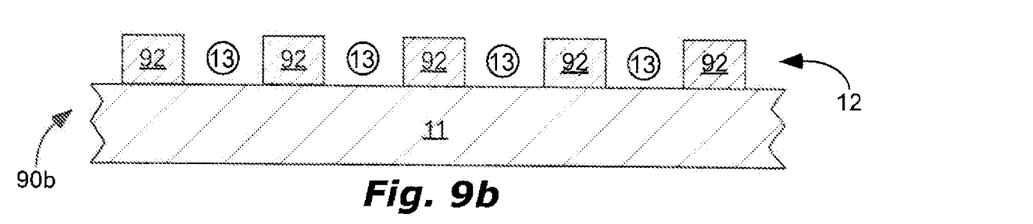
FIG. 9b is a schematic, cross-sectional side-view of a polarizer 90b, including polarization structures 12 configured for polarization of light, the polarization structures 12 including a dielectric rib 92, in accordance with an embodiment of the present invention.

The polarization structures 12 of polarizer 90b in FIG. 9b comprise a dielectric rib 92, which can be an absorptive rib or a transparent rib.

Figure 9C:
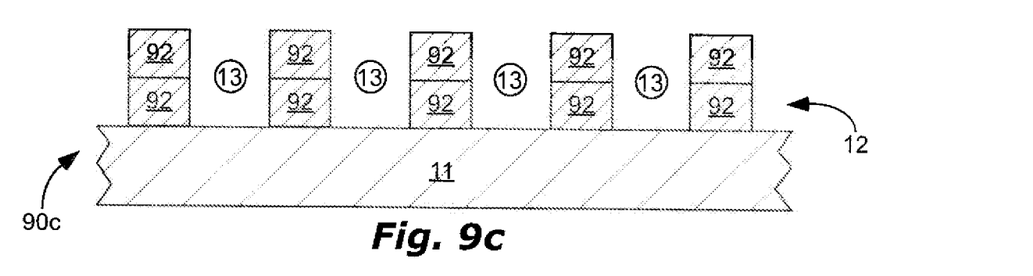
FIG. 9c is a schematic, cross-sectional side-view of a polarizer 90c, including polarization structures 12 configured for polarization of light, the polarization structures 12 including multiple dielectric ribs 92, in accordance with an embodiment of the present invention.

The polarization structures 12 of polarizer 90c in FIG. 9c comprise two dielectric ribs 92, each of which can be an absorptive rib or a transparent rib. Thus, polarizer 90c can include two absorptive ribs, two transparent ribs, or an absorptive rib and a transparent rib. Only two dielectric ribs 92 are illustrated in FIG. 9c, but the polarizer 90c can include additional absorptive rib(s), additional transparent rib(s), reflective rib(s) 91, or combinations thereof, in each polarization structure 12.

Figure 9D:
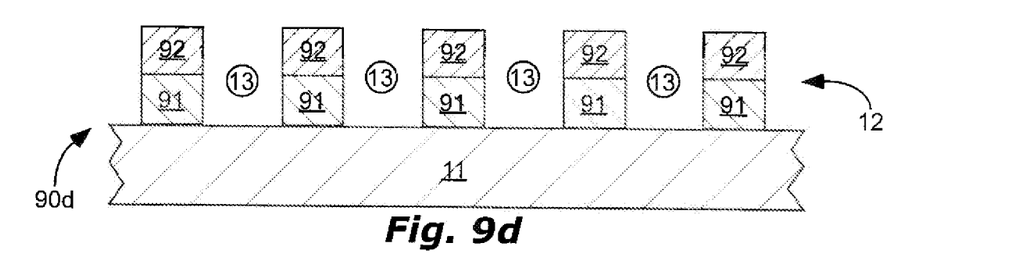
FIG. 9d is a schematic, cross-sectional side-view of polarizer 90d, including polarization structures 12 configured for polarization of light, the polarization structures 12 including a reflective rib 91 and a dielectric rib 92, in accordance with an embodiment of the present invention.

The polarization structures 12 of polarizer 90d in FIG. 9d each comprise a reflective rib 91 and a dielectric rib 92. The dielectric rib 92 can be an absorptive rib or a transparent rib. Although the reflective rib 91 is illustrated as closer to the substrate 11 in FIG. 9d, the opposite configuration is also within the scope of the inventions herein, with the dielectric rib 92 closer to the substrate 11.

Figure 9E:
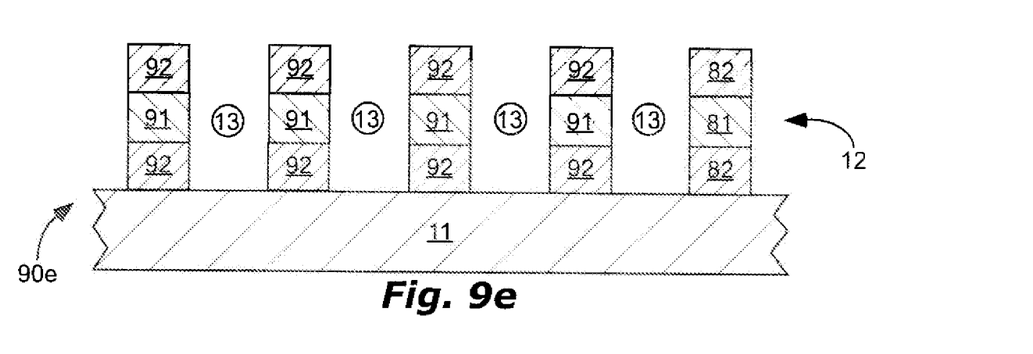
FIG. 9e is a schematic, cross-sectional side-view of polarizer 90e, including polarization structures 12 configured for polarization of light, the polarization structures 12 including a reflective rib 91 sandwiched between a pair of dielectric ribs 92, in accordance with an embodiment of the present invention.

The polarization structures 12 of polarizer 90e in FIG. 9e comprise a reflective rib 91 sandwiched between a pair of dielectric ribs 92. Each dielectric rib 92 can be an absorptive rib or a transparent rib. Thus, polarizer 90e can include two absorptive ribs, two transparent ribs, or an absorptive rib and a transparent rib. If the two dielectric ribs 92 in FIG. 9e are an absorptive rib and a transparent rib, either the absorptive rib or the transparent rib can be the dielectric rib 92 closest to the substrate 11, and the other farthest from the substrate 11.

A choice between the embodiments of FIGS. 90a-90e can be made based on polarizer application and wavelength range of polarization.

Composite Reflective

The reflective rib 91 can be a composite of at least two different elements, defining reflective rib elements. Material of the reflective rib 91 can be homogeneous throughout. The reflective rib elements can be spread evenly throughout the reflective rib 91. Use of a composite can improve polarizer high temperature resistance, corrosion resistance, oxidation resistance, or combinations thereof.

For example, aluminum has traditionally been used as the reflective rib in wire grid polarizers. These polarizers are often used in projectors. The thin aluminum ribs/wires can deform at temperatures around 400° C. and melt at 660° C. Wire grid polarizers in image projectors have failed in this manner. Although aluminum is thought of as being corrosion resistant, it does corrode a small amount, and with wires having a width of around 60 nm, any small amount of corrosion can ruin the wire. As another example, the aluminum wire can change in size due to oxidation at an outer surface, converting reflective aluminum into transparent aluminum oxide, with vastly different optical properties.

Aluminum, silver, or both can be combined with other element(s) in a compound in order to improve on the above properties. Alternatively, aluminum, silver, or both can be replaced entirely with different chemical elements. An element susceptible to corrosion or oxidation (e.g. Al or Ag), can be combined with a chemical element more resistant to corrosion or oxidation (e.g. Au, Cr, Mo, Nd, Ni, Pt, Ti, W) to form the reflective rib 91. Thus, for example, the reflective rib 91 can be more resistant to corrosion (e.g. water corrosion), to oxidation, or both, than pure aluminum or pure silver.

The reflective rib 91 can be a composite of Ti and W. A combined weight percent of Ti and W in the reflective rib 91 can be ≥25%, ≥50%, ≥75%, ≥90%, or ≥99%. If Ti and W don't constitute 100% of the reflective rib 91, the remainder can be Al, Ag, Au, Cr, Mo, Nd, Ni, Pt, or combinations thereof, or any other element.

The reflective rib 91 can be a composite of Al and Cr. A combined weight percent of Al and Cr in the reflective rib 91 can be ≥25%, ≥50%, ≥75%, ≥90%, or ≥99%. If Al and Cr don't constitute 100% of the reflective rib 91, the remainder can be Ag, Au, Mo, Nd, Ni, Pt, Ti, W, or combinations thereof, or any other element.

The reflective rib 91 can be a composite of Al and Ti. A combined weight percent of Al and Ti in the reflective rib 91 can be ≥25%, ≥50%, ≥75%, ≥90%, or ≥99%. If Al and Ti don't constitute 100% of the reflective rib 91, the remainder can be Ag, Au, Cr, Mo, Nd, Ni, Pt, W, or combinations thereof, or any other element.

The reflective rib 91 can be a composite of Al and Mo. A combined weight percent of Al and Mo in the reflective rib 91 can be ≥25%, ≥50%, ≥75%, ≥90%, or ≥99%. If Al and Mo don't constitute 100% of the reflective rib 91, the remainder can be Ag, Au, Cr, Nd, Ni, Pt, Ti, W, or combinations thereof, or any other element.

The reflective rib 91, with a lower melting point chemical element (e.g. Al), can withstand a higher temperature by adding higher melting point chemical element(s) (e.g. Ag, Ce, Cr, Mo, Nb, Nd, Pt, Sc, Ta, Th, Ti, W). The reflective rib 91 as a composite can have a higher melting point, such as for example ≥700° C., ≥800° C., ≥900° C., or ≥1000° C.

Following are example reflective rib 91 compositions. Reflective rib elements can include any combination of Al, Ag, Au, B, Ce, Cr, Mo, Nb, Nd, Ni, Pt, Sc, Ta, Th, Ti, W. Oxygen, nitrogen, fluorine, or combinations thereof can be not counted as one of, the reflective rib elements. Each reflective rib element can have an atomic number ≥12. The reflective rib elements can include metals, metalloids, or both. The reflective rib elements can include Al or Ag with a mass percent in the reflective rib 91 of ≤85%, ≤90%, ≤95%, ≤98%, ≤99%, or ≤99.9%; and ≥0.1%, ≥5%, ≥10%, ≥50%, ≥80%, or ≥85%.

The reflective rib elements can include Al plus one, two, or more than two elements other than Al. Example mass percentages of the non-aluminum chemical elements include ≥0.1%, ≥0.5%, ≥1%, or ≥5%; and ≤5%, ≤10%, ≤20%, ≤50%, ≤70%, ≤90%, or ≤99.9%. Note that an outer edge of an aluminum reflective rib 91 is a natural oxidation, aluminum oxide ($Al_2O_3$). Aluminum oxide is transparent, thus not part of the aluminum reflective rib 91 (i.e. it is transparent— not reflective). Therefore, the oxygen of aluminum oxide is not one of the reflective rib elements.

The reflective rib elements can include Ag plus one, two, or more than two elements other than Ag. Example mass percentages of the non-silver chemical elements include ≥0.1%, ≥0.5%, ≥1%, or ≥5%; and ≤5%, ≤10%, ≤20%, ≤50%, 70%, ≤90%, or ≤99.9%.

Added factors to consider, in selection of reflective rib elements, include refractive index n, extinction coefficient k, etchability, and resistivity. The reflective rib 91 can have extinction coefficient k>0.1 and reflectance R>0.6 at a wavelength range of intended use, across the ultraviolet spectrum, across the visible spectrum, across the infrared spectrum, or combinations thereof. An equation for calculation of R is listed in the definitions section above. It can be helpful if all reflective rib elements are reflective materials. The reflective rib elements can each have k>0.1 and R>0.6 at a wavelength in the ultraviolet spectrum, the visible spectrum, the infrared spectrum, or combinations thereof. The reflective rib 91 can be electrically conductive. For example, the reflective rib 91 can have resistivity ≤$10^{-4}$ ohm*m, ≤$10^{-6}$ ohm*m, or ≤$10^{-8}$ ohm*m.

A total percentage of all elements in the reflective rib is 100 mass percent.

Composite Absorptive

The absorptive rib(s) can each independently be a composite of at least two different elements, defining absorptive rib elements.

All absorptive rib elements can be absorptive. Alternatively, the absorptive rib elements can include an element that would normally result in a reflective structure if used by itself, but that results in an absorptive rib when combined with absorptive elements. For example, the absorptive rib(s) can include C, Ge, Si, Ta, or combinations thereof (absorptive elements), combined with Al, Ag, Au, B, Ce, Cr, Mo, Nb, Nd, Ni, Pt, Sc, Ta, Th, Ti, W, or combinations thereof (reflective elements). Normally, the absorptive rib(s) will include a small percent of the reflective elements and a large percent of the absorptive elements. For example, the absorptive rib(s) can include:

≥0.01 mass percent, ≥0.1 mass percent, or ≥1 mass percent of the reflective element(s), and ≤1 mass percent, ≤10 mass percent, or ≤25 mass percent of the reflective element(s); ≥75 mass percent, ≥90 mass percent, ≥95 mass percent, or ≥99 mass percent of the absorptive element(s), and ≤90 mass percent, ≤95 mass percent, or ≤100 mass percent of the absorptive element(s); and the mass percent of the reflective element(s) plus a mass percent of the absorptive element(s) is ≤100 mass percent.

Oxygen, nitrogen, fluorine, or combinations thereof can be not counted as one of, the absorptive rib elements. Each absorptive rib element can have an atomic number ≥14. The absorptive rib elements can be metals, metalloids, or both. The absorptive rib elements can include any combination of C, Ge, Si, and Ta. The dielectric rib 92 can be homogeneous throughout. The absorptive rib elements can be spread evenly throughout the dielectric rib 92.

Use of composite absorptive rib(s) can improve corrosion resistance and polarizer performance. For example, a desirable characteristic of absorptive polarizers is reduced reflection (e.g. reduced Rs) of the primarily-absorbed polarization. Germanium can be useful due to low Rs (better than silicon), but is also susceptible to corrosion. A germanium-silicon composite can have good performance (like germanium) but with improved corrosion resistance. As another example, each absorptive material can have optimal performance at a specific, narrow wavelength range. Use of a composite of multiple, absorptive elements can increase the range of optimal performance (i.e. improved broadband performance).

Following are example absorptive rib compositions. A mass percent of each of the absorptive rib elements in the absorptive rib can be ≥1%. The absorptive rib elements can include Ge with a mass percent in the absorptive rib of ≤30%, ≤50%, ≤80%, ≤99%, or ≤99.9%; and ≥0.1%, ≥10%, ≥20%, or ≥30%. The absorptive rib elements can include Si with a mass percent in the absorptive rib of ≤30%, ≤50%, ≤80%, ≤99%, or ≤99.9%; and ≥0.1%, ≥10%, ≥20%, or ≥30%. The mass percent of Ge in the absorptive rib can be greater than the mass percent of Si in the absorptive rib.

Added factors to consider, in selection of absorptive rib elements, include refractive index n, extinction coefficient k, and etchability. The absorptive rib 71 can have extinction coefficient k>0.1 and reflectance R≤0.6 at a wavelength range of intended use, across the ultraviolet spectrum, the visible spectrum, the infrared spectrum, or combinations thereof. An equation for calculation of R is listed in the definitions section above. It can be helpful if all absorptive rib elements are absorptive materials. The absorptive rib elements can each have k>0.1 and R≤0.6 at a wavelength in the ultraviolet spectrum, the visible spectrum, the infrared spectrum, or combinations thereof.

A total mass percent of all elements in the absorptive rib is 100 mass percent.

Composite Transparent

The transparent layers described herein, which can be the substrate 11, the continuous thin-film 31, the transparent rib, or combinations thereof, can be a composite of ≥2, ≥3, or ≥4 different elements, defining transparent layer elements.

Oxygen, fluorine, carbon, nitrogen, or combinations thereof can be not counted as, transparent layer elements. Although oxygen, fluorine, and nitrogen might not be counted as transparent layer elements, they can be included in the transparent layer. For example, the transparent layer can include combinations of aluminum oxide, hafnium oxide, magnesium fluoride, magnesium oxide, niobium oxide, sapphire, silicon dioxide, silicon nitride, silicon oxynitride, silicon carbide, titanium oxide, and zirconium oxide. Each transparent layer element can be a metal or a metalloid. Each transparent layer element can have an atomic number ≥12. Example transparent layer elements include Al, Hf, Mg, Nb, Si, Ti, Zr, transition metals, and lanthanide series metals.

Example minimum mass percentages of each of the transparent layer elements in the transparent layer include ≥0.01%, ≥1%, ≥10%, or ≥25%. Example maximum mass percentages of each of the transparent layer elements in the transparent layer include ≤99.5%, ≤99%, ≤90%, or ≤70%. A total percentage of all elements in the transparent layer is 100 mass percent.

The transparent layer can have k≤0.1, k≤0.01, or k≤0.001 across a wavelength range of intended use, the ultraviolet spectrum, the visible spectrum, the infrared spectrum, or combinations thereof. k is the extinction coefficient.

Material of the transparent layer can be homogeneous throughout the transparent layer. The transparent layer elements are spread evenly throughout the transparent layer.

Use of a composite as the transparent layer(s) can improve polarizer corrosion resistance, performance, durability, and high-temperature resistance. Additional useful characteristics of the transparent layer(s), which can be improved by use of a composite, include broad wavelength range transparency, increased thermal conductivity, increased electrical resistance, toughness, and the ability to polish.

For example, silicon dioxide can be useful due to its low refractive index n. Aluminum oxide can be useful due to its high coefficient of thermal conductivity. A composite of these two materials can have improved overall properties. A mass percent of aluminum oxide in the transparent layer can be greater than a mass percent silicon dioxide in the transparent layer, in order to improve thermal conductivity.

How to Make

The composites described above can be made by sputter deposition. A sputter target can be selected that has the desired chemical elements in the desired ratios. Alternatively, the desired chemical elements can be mixed in a colloidal suspension. Curing, or causing a chemical reaction in, the colloidal suspension can include evaporating or reacting a solvent.

What is claimed is:

1. A polarizer comprising:
   polarization structures configured for polarization of light, the polarization structures including a reflective rib and an absorptive rib;
   k>0.1 and R>0.6 for the reflective rib and k>0.1 and R≤0.6 for the absorptive rib across a visible spectrum of light, where reflectance R is calculated from:

$$R = \frac{(n-1)^2 + k^2}{(n+1)^2 + k^2},$$

n is a real part of a refractive index, and k is an extinction coefficient;
   the reflective rib being a composite of two different elements, defining reflective rib elements, every reflective rib element is a metal;
   the absorptive rib is a composite of two different elements, defining absorptive rib elements, and oxygen is not counted as an absorptive rib element; and
   a transparent layer, the transparent layer being a composite of two different elements, defining transparent layer elements, oxygen, nitrogen, and fluorine not counted as transparent layer elements; and k≤0.1 for the transparent layer.

2. The polarizer of claim 1, wherein the reflective rib elements include Al and Mo.

3. The polarizer of claim 1, wherein the transparent layer is a transparent rib in the polarization structures.

4. A polarizer comprising:
   polarization structures configured for polarization of light, the polarization structures including a reflective rib;
   the reflective rib being a composite of two different elements, defining reflective rib elements, the reflective rib elements include aluminum plus two elements other than aluminum, a mass percent of aluminum in the reflective rib is ≤99%, and a mass percent of each of the two other elements in the reflective rib is 0.5% and ≤20%; and
   the reflective rib having a melting point of ≥700° C.

5. The polarizer of claim 4, wherein the reflective rib has resistivity ≤10⁻⁶ ohm*m.

6. The polarizer of claim 4, wherein the reflective rib has the melting point of ≥900° C.

7. The polarizer of claim 4, wherein:
   the reflective rib has k >0.1 and R >0.6 across the ultraviolet spectrum, the visible spectrum, or both;
   the reflective rib elements each have k >0.1 and R >0.6 at a wavelength in the ultraviolet spectrum, the visible spectrum, or both;
   reflectance (R) is calculated by $$R = \frac{(n-1)^2 + k^2}{(n+1)^2 + k^2},$$

n is a real part of a refractive index, and k is an extinction coefficient.

8. The polarizer of claim 4, wherein each reflective rib element is a metal.

9. The polarizer of claim 4, wherein material of the reflective rib is homogeneous throughout the reflective rib and the reflective rib elements are spread evenly throughout the reflective rib.

10. The polarizer of claim 4, wherein the polarization structures further comprise an absorptive rib, and the absorptive rib is a composite of two different elements, defining absorptive rib elements, and oxygen is not counted as absorptive rib elements.

11. The polarizer of claim 4, wherein the reflective rib elements include Mo.

12. A polarizer comprising:
the polarization structures further comprise polarization structures configured for polarization of light, the polarization structures including a reflective rib and a pair of absorptive ribs;
the reflective rib being a composite of two different elements, defining reflective rib elements;
the reflective rib having a melting point of ≥700° C.;
each of the pair of absorptive ribs is independently a composite of two different elements, defining absorptive rib elements, oxygen is not counted as absorptive rib elements; and
the reflective rib is sandwiched between the pair of absorptive ribs.

13. A polarizer comprising:
polarization structures configured for polarization of light, the polarization structures including a reflective rib;
the reflective rib being a composite of two different elements, defining reflective rib elements; and
the reflective rib having a melting point of ≥700° C.; and
a transparent layer, the transparent layer being a composite of two different elements, defining transparent layer elements, oxygen, nitrogen, and fluorine not counted as transparent layer elements.

14. The polarizer of claim 13, wherein one of the reflective rib elements is aluminum, and a mass percent of aluminum in the reflective rib is ≤99%.

15. The polarizer of claim 14, wherein the mass percent of aluminum in the reflective rib is ≥80%.

16. The polarizer of claim 14, wherein the reflective rib is more resistant to water corrosion and to oxidation than pure aluminum.

17. The polarizer of claim 14, wherein one of the reflective rib elements is Au, B, Ce, Nb, Nd, Ni, Pt, Sc, Ta, Th, or W.

18. The polarizer of claim 13, further comprising:
the polarization structures include an absorptive rib, the absorptive rib being a composite of two different elements, defining absorptive rib elements, oxygen not counted as absorptive rib elements; and
the polarizer includes a transparent layer, the transparent layer being a composite of two different elements, defining transparent layer elements, oxygen, nitrogen, and fluorine not counted as transparent layer elements.

19. The polarizer of claim 13, wherein the transparent layer is a transparent rib in the polarization structures.

20. The polarizer of claim 13, wherein the transparent layer is a substrate, the polarization structures located on the substrate, the substrate providing structural support for the polarization structures.

* * * * *